US008045314B2

(12) United States Patent
Ibok

(10) Patent No.: US 8,045,314 B2
(45) Date of Patent: Oct. 25, 2011

(54) METHOD OF ATMOSPHERIC DISCHARGE ENERGY CONVERSION, STORAGE AND DISTRIBUTION

(75) Inventor: Effiong Etukudo Ibok, Sunnyvale, CA (US)

(73) Assignee: The Travis Business Group, Inc., Sunnyvale, CA (US)

( * ) Notice: Subject to any disclaimer, the term of this patent is extended or adjusted under 35 U.S.C. 154(b) by 0 days.

(21) Appl. No.: 12/534,115

(22) Filed: Aug. 1, 2009

(65) Prior Publication Data

US 2010/0220424 A1 Sep. 2, 2010

(51) Int. Cl.

| | |
|---|---|
| ***H01T 23/00*** | (2006.01) |
| ***H02H 1/04*** | (2006.01) |
| ***H02H 1/00*** | (2006.01) |

(52) U.S. Cl. ........ 361/231; 361/117; 361/126; 361/127; 361/128; 361/233

(58) Field of Classification Search .................. 361/117, 361/126–128, 231, 233

See application file for complete search history.

(56) References Cited

U.S. PATENT DOCUMENTS

| | | | | |
|---|---|---|---|---|
| 911,260 | A * | 2/1909 | Pennock | 307/149 |
| 1,869,661 | A * | 8/1932 | Bumbaugh | 174/2 |
| 5,367,245 | A * | 11/1994 | Mims | 322/2 R |
| 6,038,117 | A * | 3/2000 | Dullni et al. | 361/58 |
| 6,813,137 | B2 * | 11/2004 | Matsuoka et al. | 361/305 |
| 7,033,406 | B2 * | 4/2006 | Weir et al. | 29/623.5 |
| 2002/0101700 | A1 * | 8/2002 | Betts | 361/230 |
| 2006/0001068 | A1 * | 1/2006 | Mosley et al. | 257/306 |
| 2009/0109712 | A1 * | 4/2009 | Calloway | 363/32 |
| 2010/0007321 | A1 * | 1/2010 | Ogram | 323/299 |

FOREIGN PATENT DOCUMENTS

| | | | |
|---|---|---|---|
| DE | 4205521 | A1 * | 4/1993 |
| JP | 04208637 | A * | 7/1992 |
| JP | 08330093 | A * | 12/1996 |

OTHER PUBLICATIONS

English language abstract of Kobayashi (JP 04-208637).*
English language machine translation of Kimura (JP 08-330093).*
English language machine translation of Pengel (DE 4205521).*

* cited by examiner

*Primary Examiner* — Jared Fureman
*Assistant Examiner* — Scott Bauer
(74) *Attorney, Agent, or Firm* — Blakely, Sokoloff, Taylor & Zafman, LL

(57) ABSTRACT

A method of converting atmospheric electrical discharge to a useable form of energy by arresting, storage and retransmission of lightning induced electrical discharge is disclosed. The invention discloses methods of deploying this technology even in isolated locations where no electricity infrastructure exists. Additionally, the potential for achieving in excess of 1 GWe of electrical power supply at costs orders of magnitude lower than fossil fuel or solar is also disclosed. Isolated collection units are disclosed. A method of deployment of these devices on individual cars and recharge stations is disclosed which in effect unplugs these automotive and recharge stations from the grid. This capability significantly decreases their dependence on the electricity grid infrastructure, enabling a much more enhanced rollout capability for the industry. The concept of Energy Dams is disclosed. These are facilities with substantial electrical energy storage capacities with the capability of receiving energy feeds from various generation sources.

18 Claims, 21 Drawing Sheets

Global Distribution of Lightning Strikes: April 1995 – February, 2003. (Source: NASA)

METHOD OF ATMOSPHERIC DISCHARGE ENERGY CONVERSION, STORAGE AND DISTRIBUTION

TECHNICAL FIELD

This invention relates to the field of electrical energy generation and storage in general and the conversion of atmospheric electrical discharge to a useable form of energy by arresting, storage and retransmission of lightning induced electrical discharge in particular.

BACKGROUND OF INVENTION

Lightning has always been a destructive force of nature. Causing death by electrocution and starting fires both in residential areas and in forests. In either case the loss of life and property is substantial. Lightning strikes have affected communication systems, and by uncontrolled arcing, electricity grids leading to loss of power with substantial economic loss Lightning is the number one cause of forest and farm fires just in the United States and causes over 80 percent of all livestock losses due to accidents. Property losses run into billions of dollars annually and thousands of deaths and injury are reported yearly. Business losses from power and communications failure run into billions of dollars annually. Up to now, lightning strike damage has generally been controlled primarily by grounding.

A lightning discharge can have voltage of 10 MV to 100 MV and current of 1 kA to 300 kA. It packs so much voltage that it can leap a mile through the air and strike another object. Lightning can strike a building directly or leaping to it after striking a tree or other nearby object or by following a power line. It can strike any object that provides an easier path to the ground for it than the air. Because of the large network of lines, lightning can strike a utility pole at one point and be transmitted to any location in the network. Because of this, utility companies use multiple grounding and other protective devices per mile to ameliorate the lightning effects.

There has been a lot of activity in the alleviation of lightning damage but none in utilizing its energy potential.

U.S. Pat. No. 7,495,168 discloses a dipole lightning conductor which can gather electrical charges from the atmosphere during a thunderstorm, opposite to the polarity of the adjacent cloud on one side and induce a different polarity on the other end contacting the ground. When a sufficient potential difference is reached between the dipole and the earth, a dielectric breakdown occurs sending a large amount of earth charge to the thundercloud, inducing a thunderbolt.

In U.S. Pat. No. 6,012,330, Palmer discloses a method of inducing lightning strikes by shooting a stream of ionized water into a thundercloud and triggering electrical conduction through the ionized water column to the ground. In this invention, while ionized water is used, advantage is taken also of capillary wetting of conducting mesh cable at the tip of which is tethered a balloon of conductor coated Mylar. It is easier to float a balloon than to pump a column of water to any significant height.

In U.S. Pat. No. 6,320,119 Gumley discloses a capacitively coupled composite air terminal with sharp and rounded end components for voltage manipulation to minimize electric field ahead of streamers to minimize corona discharge.

Kato, in U.S. Pat. No. 5,280,335, discloses a compound lightning low voltage arrester with high energy tolerance for power and telephone lines comprising a spark gap is connected to a serial combination of Zinc Oxide arrestor and a non-inductive resistor. By cooperative execution between the spark gap and the Zinc Oxide arrester, the Zinc Oxide is chosen to be of a rating such that thermal breakdown does not occur before the spark gap ignition voltage is reached. The arrangement ensures reliable and predictable discharge and arrester survival even under multiple lightning strikes of close proximity.

Subbarao in U.S. Pat. No. 4,338,648, discloses a discharge counter and arrester current meter to determine arrester steady state current and the number of discharge events occurring during a thunder storm lightning arrester event.

Greenwald and Moses in U.S. Pat. No. 5,610,813 disclose a thunderstorm cell detection and mapping system for acquiring localized lightning strike information and identifying and locating active thunderstorm cells.

In U.S. Pat. No. 4,272,720, a method of differentiating between cloud-cloud and cloud-ground discharges is disclosed. Indicating discharge events with no accompanying lightning ground strike. This indicates that even in the absence of streamers, there is significant electrical discharge that can be converted and stored.

Weir and Nelson disclose in U.S. Pat. No. 7,033,406, a high energy density ceramic capacitor with energy capacity of 52 kW·h in 2005 cu·in, the equivalent of 1600 kW·h/m$^3$. Hansen in U.S. Pat. No. 6,078,494 discloses multilayer ceramic capacitors comprising doped barium-calcium-zirconium-titanate dielectric, the materials basis for U.S. Pat. No. 7,033,406. It is claimed to be characterized by high dielectric constant, high stability of capacitance value, long service life, low loss factor, high insulation resistance capacitance, low voltage dependence, and wide temperature range stability. Electrodes of base metal alloys from the group of Ni, Fe, Co or their alloys are claimed to be perhaps just as effective as noble metals containing gold, silver, platinum and palladium and may also contain Cr, Ti, Zr, V, Al, Zn, Cu, Sn, Pb, Mn, Mo and W.

Although the energy density capacity is not disclosed, it may be in the same range as U.S. Pat. No. 7,033,406 showing a path for storing the energy that can be extracted from lightning discharge.

U.S. Pat. No. 5,361,187, claims dielectric constant (k) of up to 19000 using similar group of dielectrics and processes. In U.S. Pat. No. 5,604,167 dielectric constant values of between 11,000 and 14,000 are disclosed by the same inventor with equivalent materials and processes.

Since these capacitors use standard powder processing technique, it can reasonably be expected that equivalent characteristics may be observed with naturally occurring doped silicates such as phyllosilicates for example, montmorillonite: $(Na,Ca)_{0.33}(Al,Mg)_2(Si_4O_{10})(OH)_2.nH_2O$, or cyclosilicates such as Benitoite—$BaTi(Si_3O_9)$ as base materials appropriately calcined and doped.

In U.S. Pat. No. 6,078,494 multilayer ceramic capacitors comprising doped barium-calcium-zirconium-titanate dielectric is disclosed. It is claimed to be characterized by high dielectric constant, high stability of capacitance value, long service life, low loss factor, high insulation resistance and low voltage dependence, and wide temperature range stability. Electrodes of base metal alloys from the group of Ni, Fe, Co or their alloys are claimed to be perhaps just as effective as noble metals containing gold, silver, platinum and palladium and may also contain Cr, Ti, Zr, V, Al, Zn, Cu, Sn, Pb, Mn, Mo and W. In U.S. Pat. No. 5,361,187, the inventors claim dielectric constants of up to 19000 using similar group of dielectrics and processes. In U.S. Pat. No. 5,604,167 dielectric constant values of between 11,000 and 14,000 is disclosed by the same inventors with equivalent materials and processes. Since these capacitors use standard powder processing technique, it can reasonably be expected that equivalent characteristics may be observed with naturally occurring doped silicates such as phyllosilicates for example, various grades of montmorillonite: $(Na,Ca)_{0.33}(Al,Mg)_2(Si_4O_{10})(OH)_2.nH_2O$, or cyclosilicates such as Benitoite—$BaTi(Si_3O_9)$ as base materials appropriately calcined and doped.

Although the technology to arrest lightning strikes has been around for at least a hundred years, this invention to harness and store that power has only become viable due to recent advances in super-capacitor technology which has made possible the fabrication of ultrahigh capacitance capacitors with very long lifetimes, high power, high energy densities and very fast charge and discharge rates.

Just as flood water, another destructive force of nature in times past was controlled by building dams, and from the dams eventually came hydroelectric power; and wind including thunderstorms has now been harnessed to generate electricity, this invention describes the technology to harness the power of atmospheric discharges including lightening storms to generate useable electrical energy.

This disclosure also introduces the concept of an Energy Dam. Facilities of substantial energy storage capacity capable of receiving energy feeds from various energy sources such as Solar, Wind, Thermal Power plants and Lightning. For example, during a thunderstorm, electricity generated by wind and lightning is collected and stored.

Lightning strikes every part of the globe but not uniformly. The regions with the highest historical concentration of lightning strikes are shown in FIG. 1*c*. These include Florida and the Gulf Coast in the Americas, the Equatorial Highlands of DRC, Rwanda and Burundi in Central Africa and the Monsoon Belt in Asia.

Except for the Americas, typically, these regions have very little electricity infrastructure. With the capability disclosed here, substantial reserves of electricity can be generated, stored and possibly traded.

In regions of epileptic electricity supply, disruptions in power do not necessarily translate into disruption in service. Since when power is generated, it is fed into these energy dams or local storage units for eventual use. Just as in water supply, the customer is not necessarily conscious of when the local water company is pumping water into storage tanks or local dams, in energy dams, the customer need not be conscious of whether or when electricity is being generated by the utility company because the power to his home is drawn not necessarily live from the grid but from the local energy storage units or energy dams.

BRIEF SUMMARY OF THE INVENTION

A method of harnessing atmospheric discharge and storing said energy in a useful form for subsequent use is presented.

Since the voltage of a lighting bolt can be as high as 100 MV, a methodology for safely channeling this discharge for storage is disclosed.

It is the also the object of this invention to present a storage medium in which an energy capacity of 1 MW·h in a volume of under 1 $m^3$ can be achieved.

It is also a further objective of this invention to show how lightening strikes on tall buildings can be harnessed to provide energy for the building either directly or fed into the grid.

It is also an objective of this invention to present a methodology for harnessing lightening, heretofore a source of power disruptions for electricity grids and converting it into a useable form of energy and feeding it back into the grid.

Since each electricity grid has a lightning suppression unit, a methodology for harnessing the impulse from these units from lightening strikes and feeding it back into the grid is disclosed.

a method of deploying a network of said storage units along a utility grid is also disclosed.

It is also the objective of this invention to disclose a method of modifying the storage units for single building deployment.

A method of deploying said storage units as vehicular charging centers even in locations not readily served by a utility grid is also disclosed.

A method of manipulating the direction and movement of the lightening bolt in open air locations and redirecting them to predetermined collection points is disclosed.

Lightning storms are some of the major causes of wild fires in the world. A method of redirecting the electrical discharges in any given space via a network of polarized and non-polarized collectors is presented. The discharges can be stored, fed into the grid or grounded.

A method for non-spontaneous discharge generation and storage is disclosed. And a method for adapting the methodology for electric automotive deployment is also disclosed.

BRIEF DESCRIPTION OF DRAWINGS

For understanding of the present invention reference is made of the accompanying drawings in the following DETAILED DESCRIPTION OF THE INVENTION. In the drawings.

DETAILED DESCRIPTION OF THE INVENTION

Figure 1A:
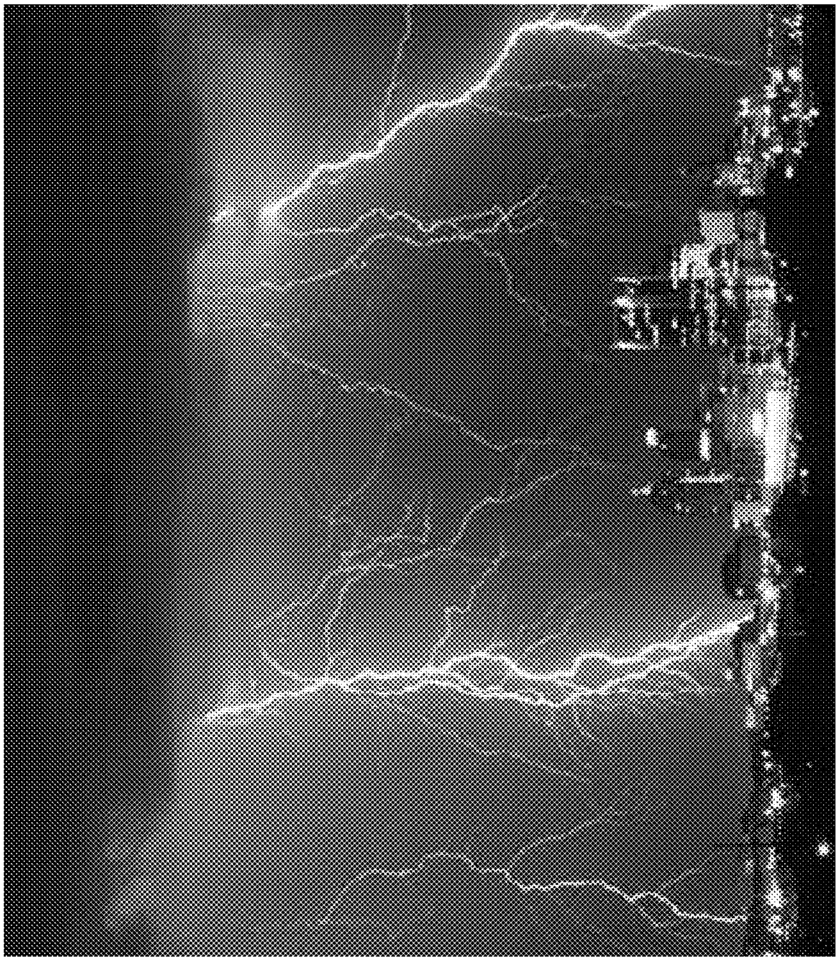
FIG. 1*a*. Picture of lightning strike over a city.
Figure 1B:
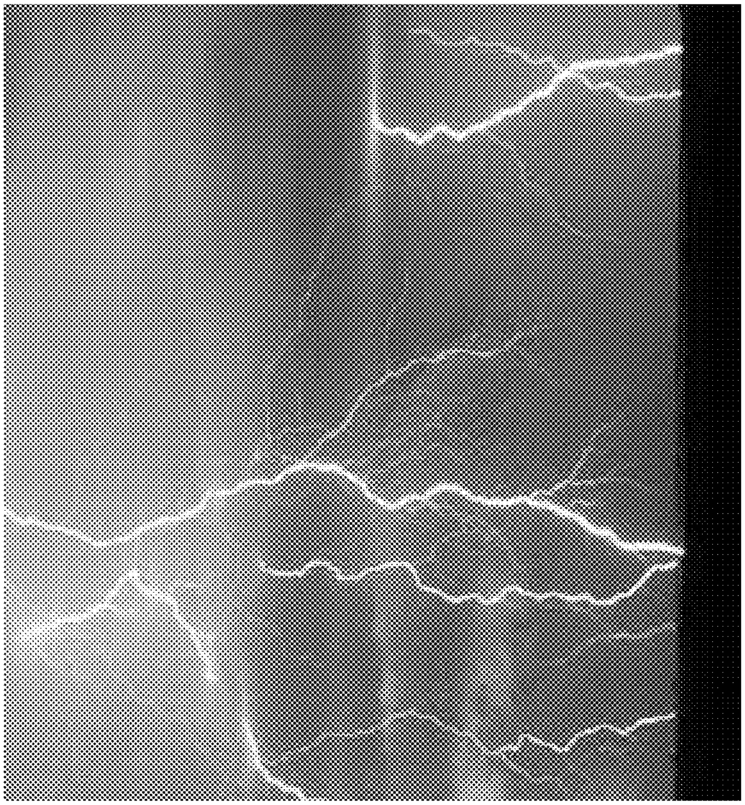
FIG. 1*b*. Picture of lightning strike over open plain.
Figure 1C:
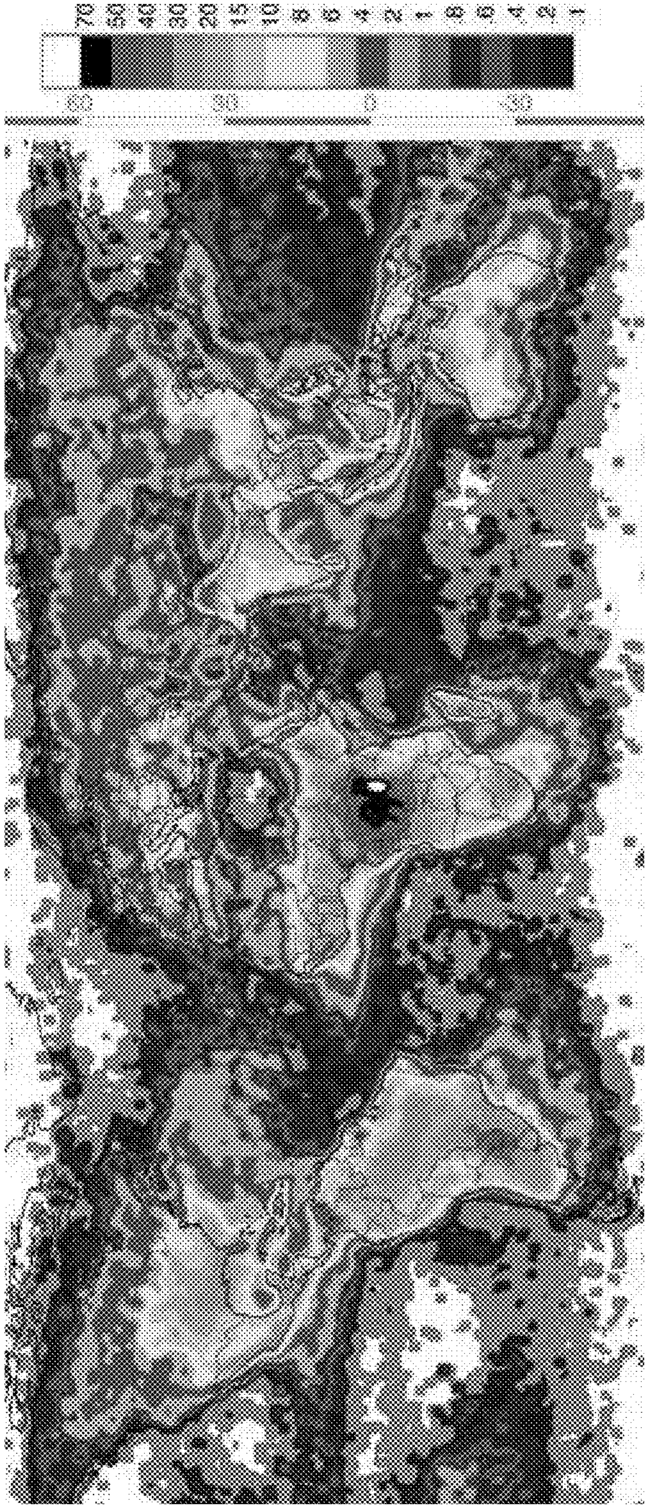
FIG. 1*c*: Global Distribution of Lightning Strikes: April 1995-February, 2003. (Source: NASA).

This invention describes a method of harnessing the electrical energy in atmospheric discharges, including, but not limited to lightning, storing said electrical energy and transmitting said energy for use. To this end, as an illustration, the preferred embodiments are represented in the drawings shown in FIGS. 2 to 15.

Since lightning discharge voltages range from 10 MV to 100 MV with current of 10 kA to 100 kA, the technology challenge will be in mitigating the ultrahigh power which range from 100 GW to in excess of 10,000 GW. Although individual strikes last less than 100 μsec, thunderstorms usually last longer than 30 min. in any cloud formation and location. Indicating that the energy that can be mined from any location in a thunderstorm can run in excess of 50 GW·H. Enough energy for 500,000 homes consuming 1000 kW·h per month. At $100 per 1000 kWh, the revenue equivalent is $5 million per thunderstorm per location.

In solar energy generation, the cost of a 1 MWe rating PV panel is about $1 million. To achieve 1 GWe, the cost implications will be about $1 billion. In fossil fuel plants, the construction cost is approximately $1.3 million per MWe, putting the cost for a 1 GWe at ~$1.3 billion excluding fuel, carbon footprint, and other operating cost. Though thunderstorms are not continuous, with storage capability, the cost basis for an atmospheric discharge energy source will be several orders of magnitude lower than fossil fuel or solar of any architecture.

Figure 2:
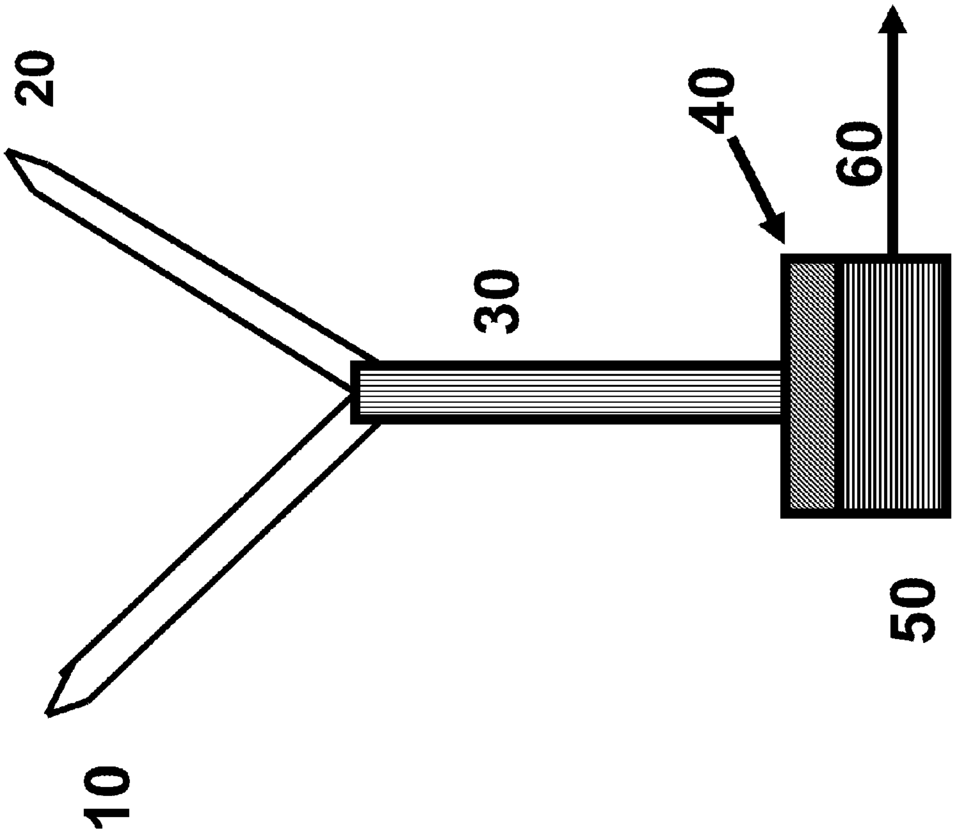
FIG. 2 shows a schematic of discharge collection and storage system.

One embodiment of this invention is depicted in FIG. 2. Lightning is collected at the air terminals 10, 20 and transmitted through the conductor 30 to an arrestor 40 and on to the capacitor 50 where the electricity is stored. From which it can be extracted 60 at point of use or transmitted into the grid.

Figure 3:
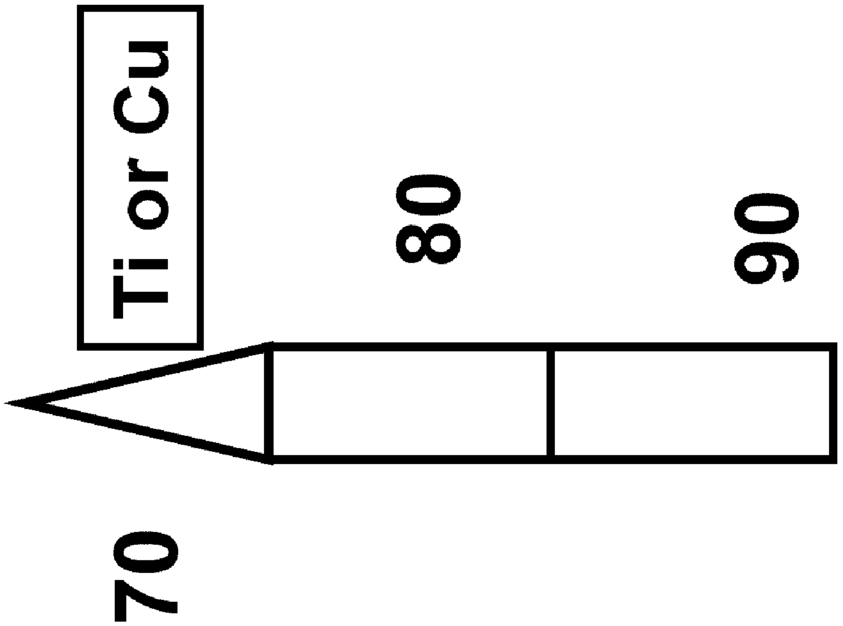
FIG. 3 shows a schematic of collection unit showing metallic composition variation.

The degree of atmospheric discharge charge collection can be influenced by the metallurgical composition of the collectors. FIG. 3 illustrates the fabrication of the collector with different metals of varying conductivities and atmospheric and electrical stability. In this embodiment, metallurgical compositions for the various segments comprise Ti, Cu, Al. Other metals or their alloys can be used depending on the required properties and the locations of deployment.

Figure 4:
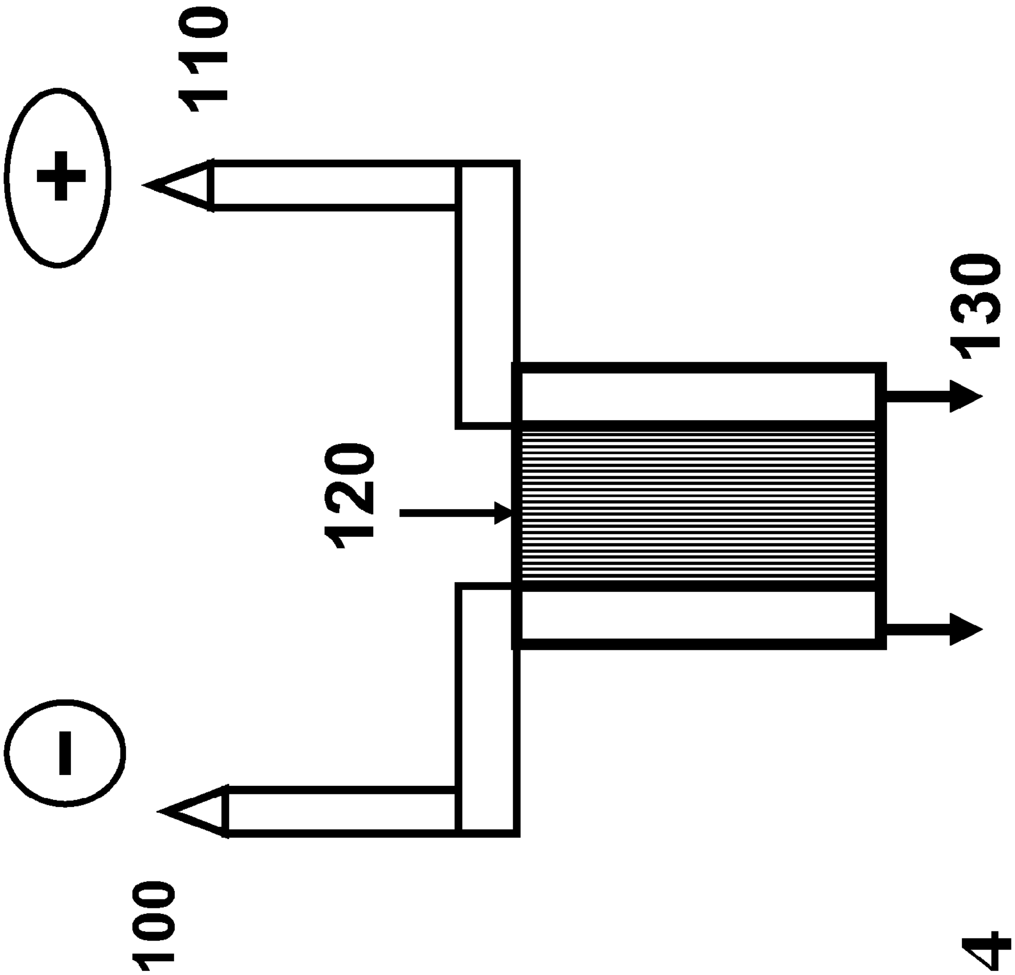
FIG. 4 Shows a Schematic of composite collector showing polarized ends.

In yet another embodiment of the invention as shown in FIG. 4, a composite collector with opposite polarity air terminals 100, 110 is used. The air terminals are isolated from each other by an insulator 120. The negative polarity terminal serves to deflect and manipulate the charge to the positive terminal from which it is conducted to the storage unit 130.

Figure 5:
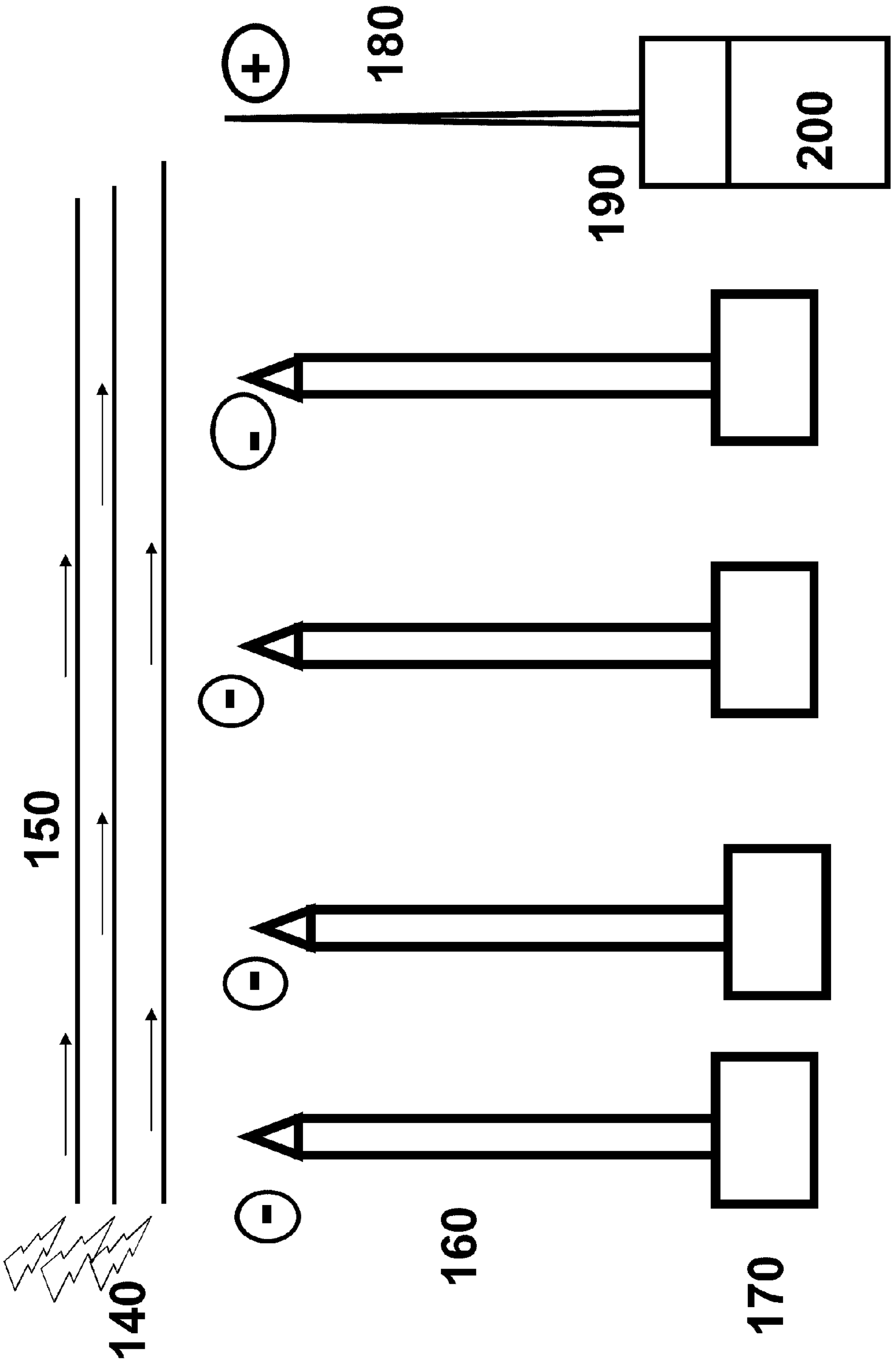
FIG. 5 Schematic of collector network configuration with negatively polarized ends to manipulate and redirect lightning electrical discharge away from the earth for eventual collection at a predetermined location.
Figure 6:
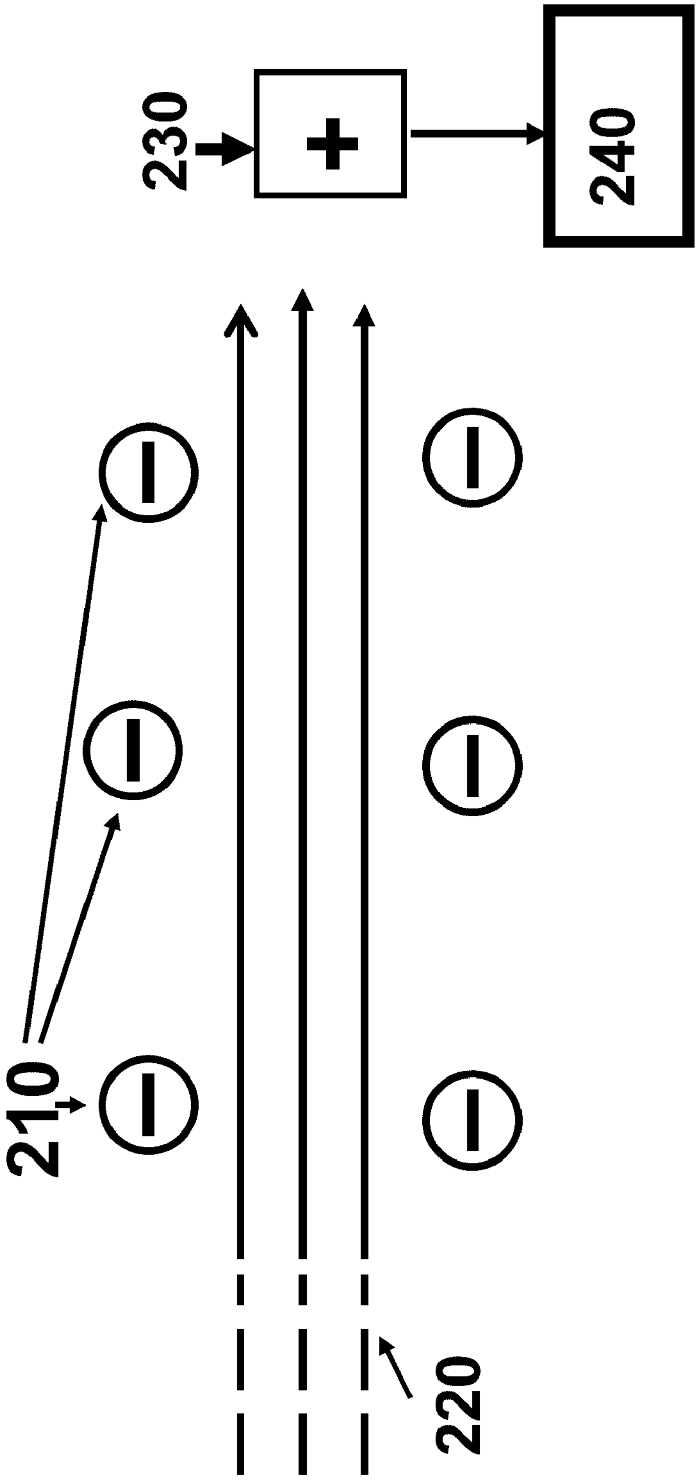
FIG. 6 Plan view of polarized collection network as shown in FIG. 5 acting to concentrate and modulate the electrical discharge and redirect such for collection at predetermined location.

Another embodiment of the invention is illustrated in FIGS. 5 and 6. In this representation, negative polarity collectors, 160 deflect the atmospheric discharge so that they do not reach the ground but are deflected for collection at a predetermined terminal 180 of positive polarity and thereafter storage 200. A plan view representation of this embodiment is shown in FIG. 6.

Figure 7A:
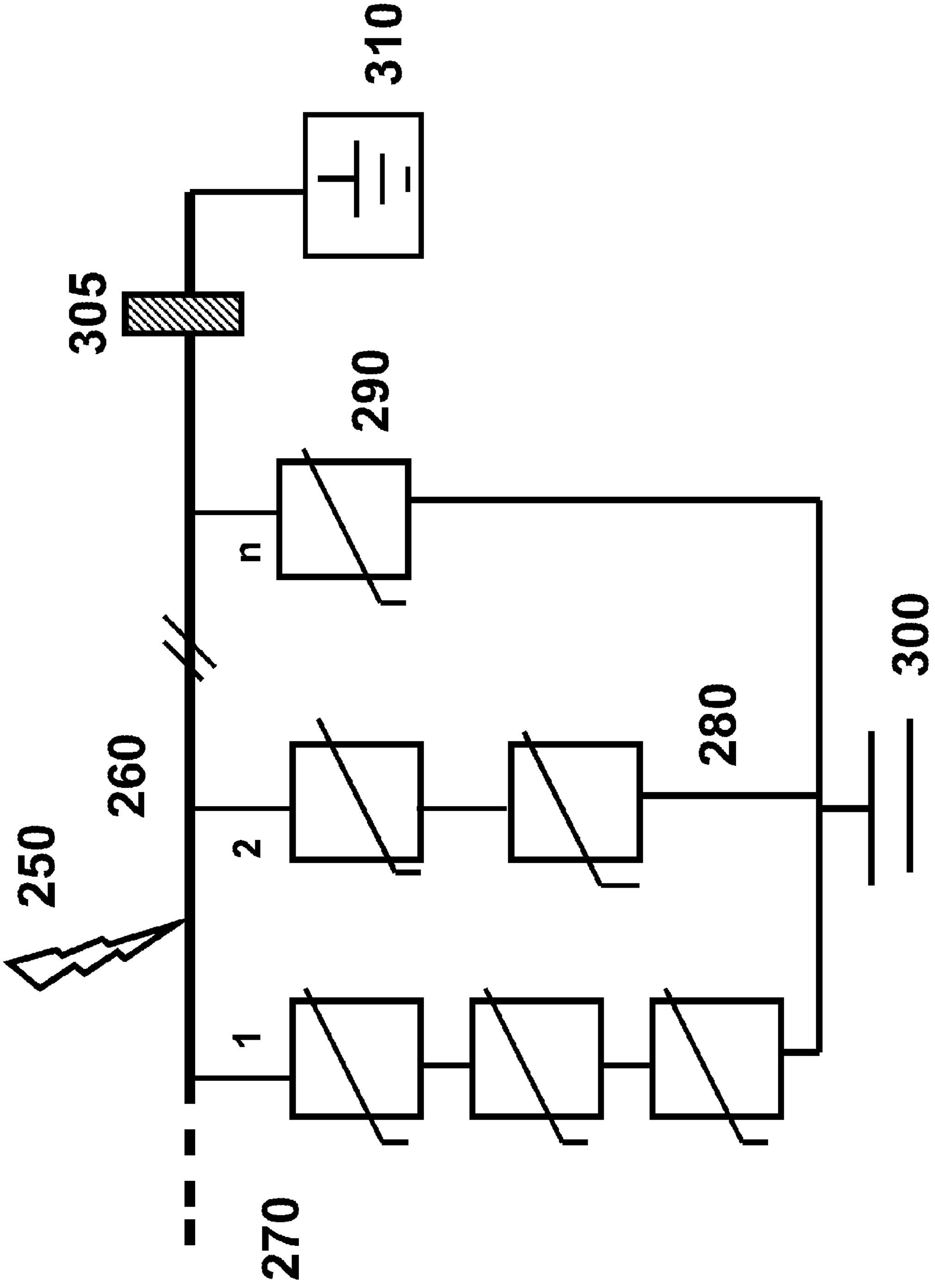
FIG. 7*a*. Schematic showing a representation of a network of varistors arranged in rows and columns with the net effect of applying resistive arrestors in parallel and in series to effect voltage mitigation of atmospheric discharges prior to collection and storage.

It is essential to mitigate the power of the lightning before storage. In one embodiment of this invention, a collection of varistors of various power capacities, linked in series 270,280 and 290 are connected in parallel in lines 1 to n, to achieve a desired capability as shown in FIG. 7*a*. The resultant power is stored in the capacitor 300. An insulator or fuse 305 is placed at the end of the varistor chain to protect the capacitor 300 against over-current. In the event of overstressing, the dielectric or varistor is deformed and the excess current is grounded.

Figure 7B:
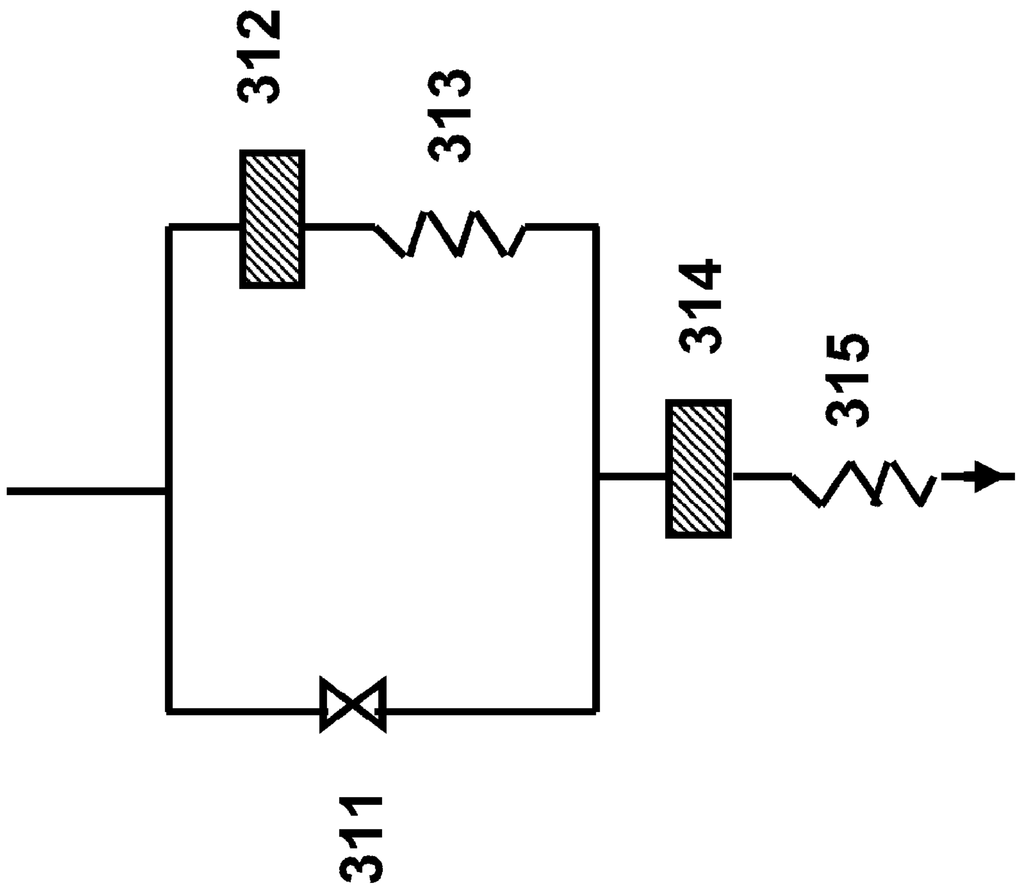
FIG. 7*b*: Schematic of varistor of power mitigation unit showing cascade of ZnO arrestor in series with non-inductive resistor in parallel with spark gap.

Each component of the power mitigation unit is any of the following configurations as shown in FIG. 7*b*: A ZnO varistor 312 connected in series with a non-inductive resistor 313 and in parallel with a spark gap 311. The resultant current is further modulated through another ZnO unit 314 and resistor 315. A cascade of this configuration could be adopted to achieve the desired properties.

Zinc Oxide has a relatively large band gap of ~3.3 eV at room temperature. The consequence of this large band gap includes, higher breakdown voltages, ability to sustain large electric field and high power and temperature operation. Because of this, ZnO is the primary component in varistors and in voltage suppression devices. Zinc Sulfide has a band gap of 3.5 eV for the cubic form and as high as 3.91 eV for the hexagonal form at 300K. While ZnO band gap can be tuned from between 3-4 eV by alloying with magnesium oxide or cadmium oxide, the co-processing of ZnO with ZnS of the hexagonal wurtzite form should provide electrical field and other operational advantages over ZnO alone.

Figure 7C:
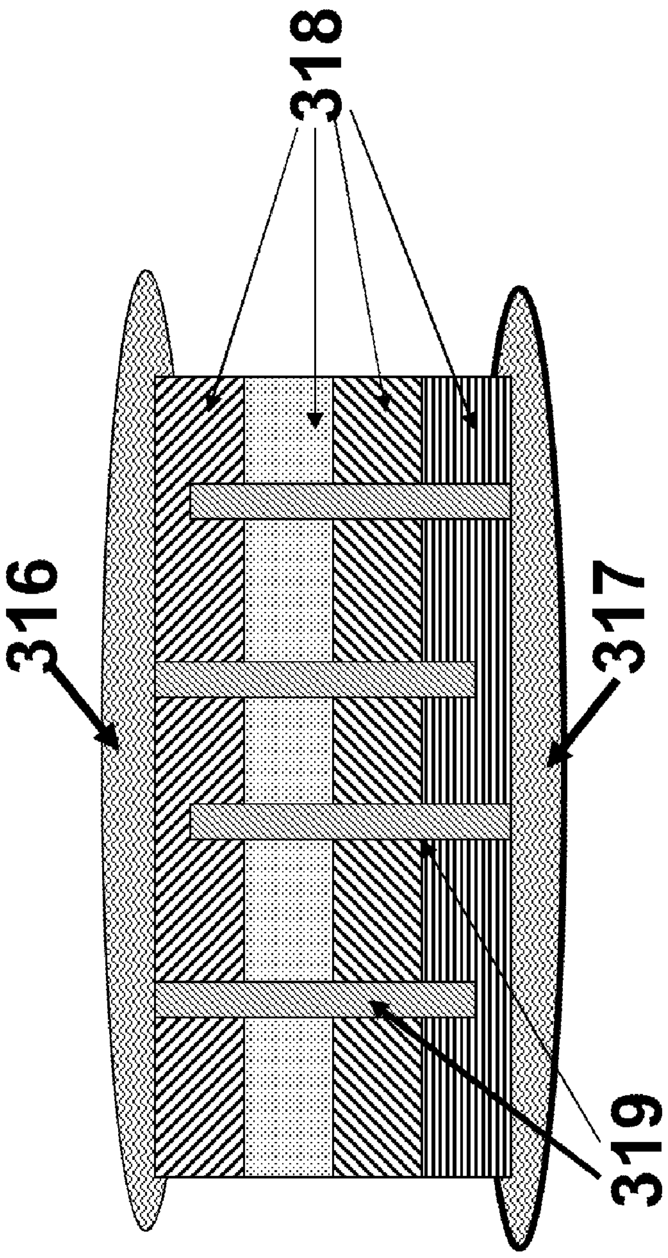
FIG. 7*c*: Multilayer varistor with ZnO, ZnS and $WO_3/WSi_2$

Multilayers of ZnO and ZnS or as sandwich layers with each other with ZnO achieving 50-99.9 mol. % of each layer can be adopted to improve on the suppression properties of the single layer ZnO varistor as is shown in FIG. 7*c*. Said varistor comprising a ceramic base body 318 of multiple layers, terminal electrodes 316, 317 and internal electrodes 319.

Alloying of ZnO with metal oxides and nitrides of transition elements including W, Zr, Mo, Mg, Cr, and Ti may improve its band gap characteristics and improve its voltage response non-linearity. Tungsten, in the form of tungsten silicide has very unique crystallization characteristics, particularly in the presence of dopants such as phosphorus or arsenic. Upon post deposition anneal, the Si in the non-stoichiometric tungsten silicide (WSix) segregates to the grain boundaries and the film interfaces. The dopant atoms diffuse preferentially along the grain boundaries. When oxidized, it is the segregated silicon that is oxidized selectively. If the W is exposed to the oxidizing ambient of $O_2$/Ar or $O_2/N_2$ at temperatures in excess of 700° C., tungsten oxide WOx (x=3, or 1.5) is formed. It has no corresponding crystallographic orientation to the underlying tungsten silicide or metal, being in the form of an amorphous powder. The fabrication of multilayer varistors with ZnO and $WSi_2/WO_3$, $SiO_2$ should provide the flexibility of modulation of the effective grain sizes of the host material to within 0.5-10μ as the case may be. This precise grain size control provides corresponding modulation of the electrical properties including overvoltage suppression.

Figure 8A:
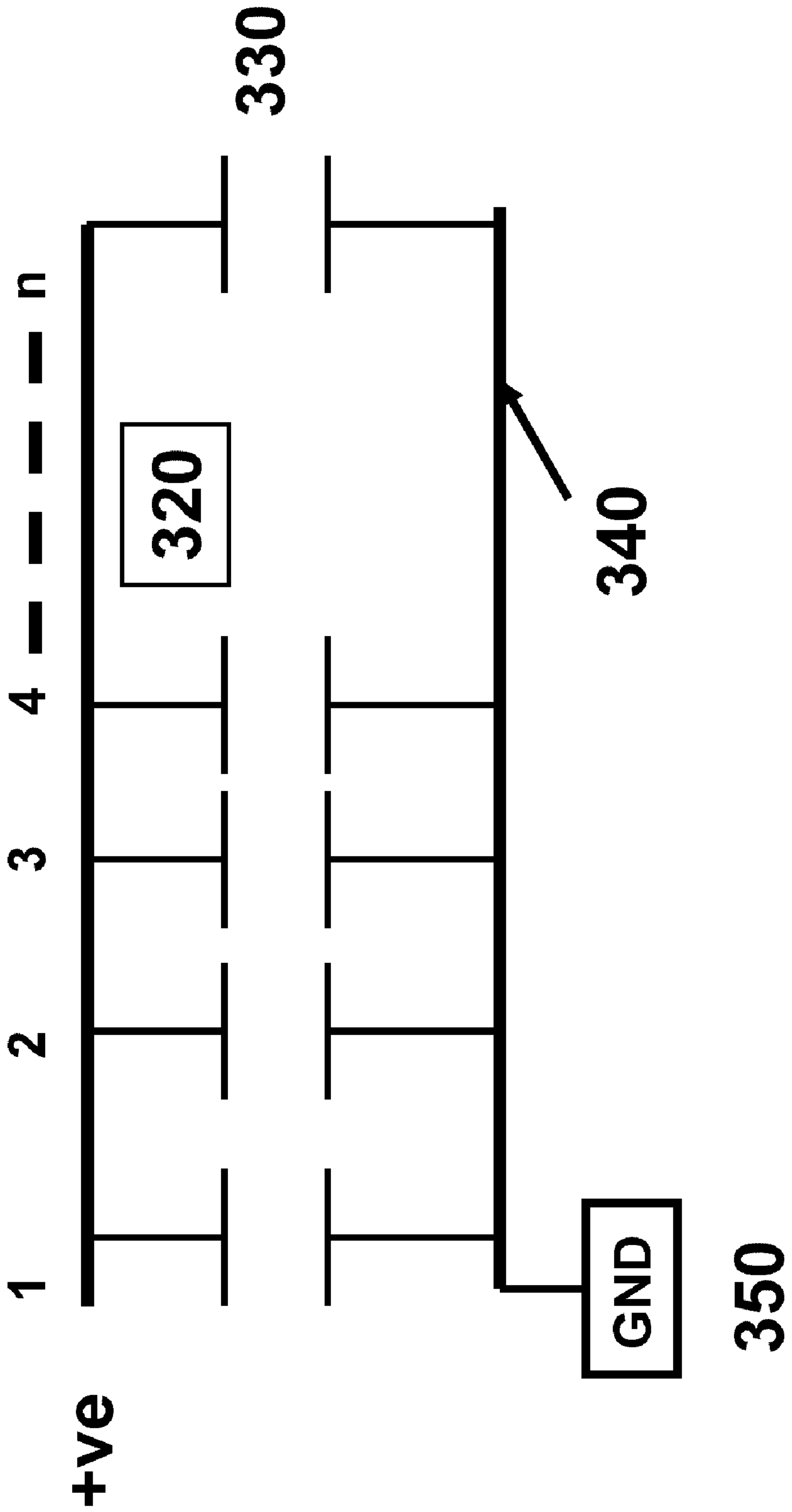
FIG. 8*a*. Schematic showing cross section of a collection unit.
Figure 8B:
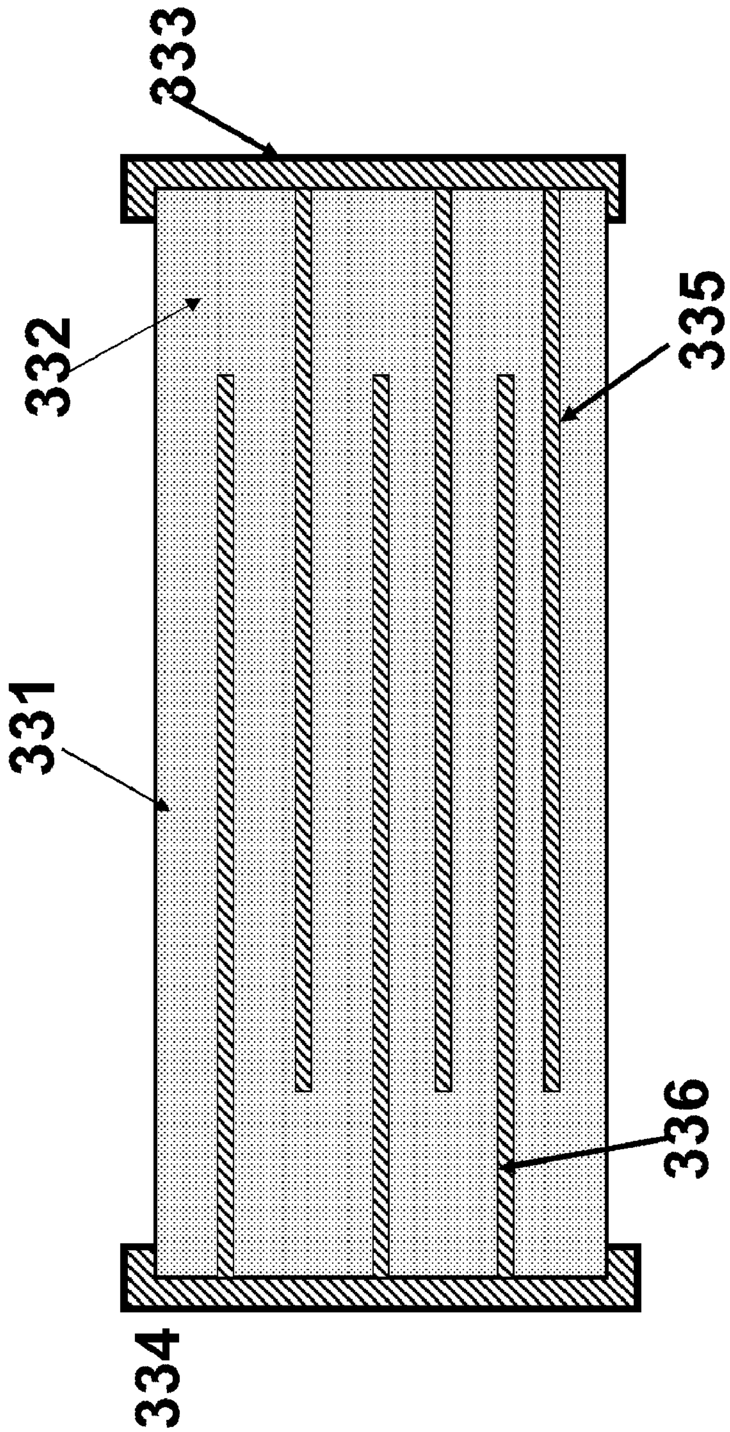
FIG. 8*b*. Schematic showing cross-section of multilayer ceramic capacitor of 8*a*.

A schematic of the storage unit 320 is shown in FIG. 8*a*. A collection of capacitors 330 are connected in parallel to achieve a desired capacitance. A schematic of the cross-section of each capacitor unit is shown in FIG. 8*b*. The unit 331 with dielectric layers 332 is a multilayer capacitor comprising alternately stacked internal electrodes 335, 336 connected to external electrodes 333, 334. The dielectric layers may be of uniform composition, or layers of different compositions optimized for flexibility in the modulation of desired electrical, physical and reliability properties.

Capacitance in excess of 1 kF/$m^3$ with energy storage capacity of 1.5 MW·h is reported as being possible by existing art. With compositional and manufacturing improvements disclosed here these benchmarks are expected to be surpassed making possible energy storage capacities of up to 1 GW·h. Sufficient energy for 1000 households consuming 1000 kW·h of electricity per month for one month.

Figure 9:
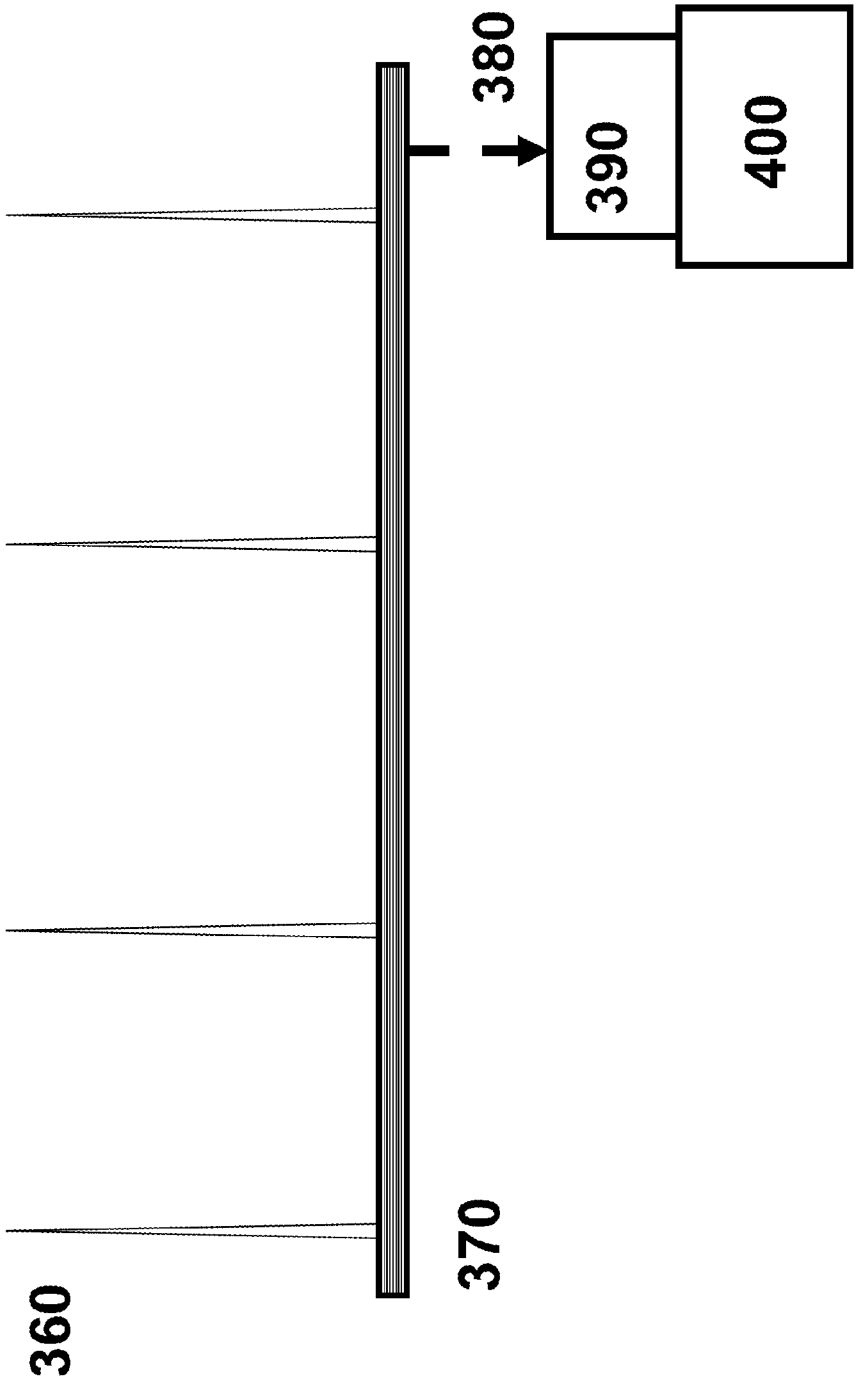
FIG. 9 Schematic of collection unit network mesh in forested area with air frames deployed on each tree as collection of trees linked in a mesh network.
Figure 10:
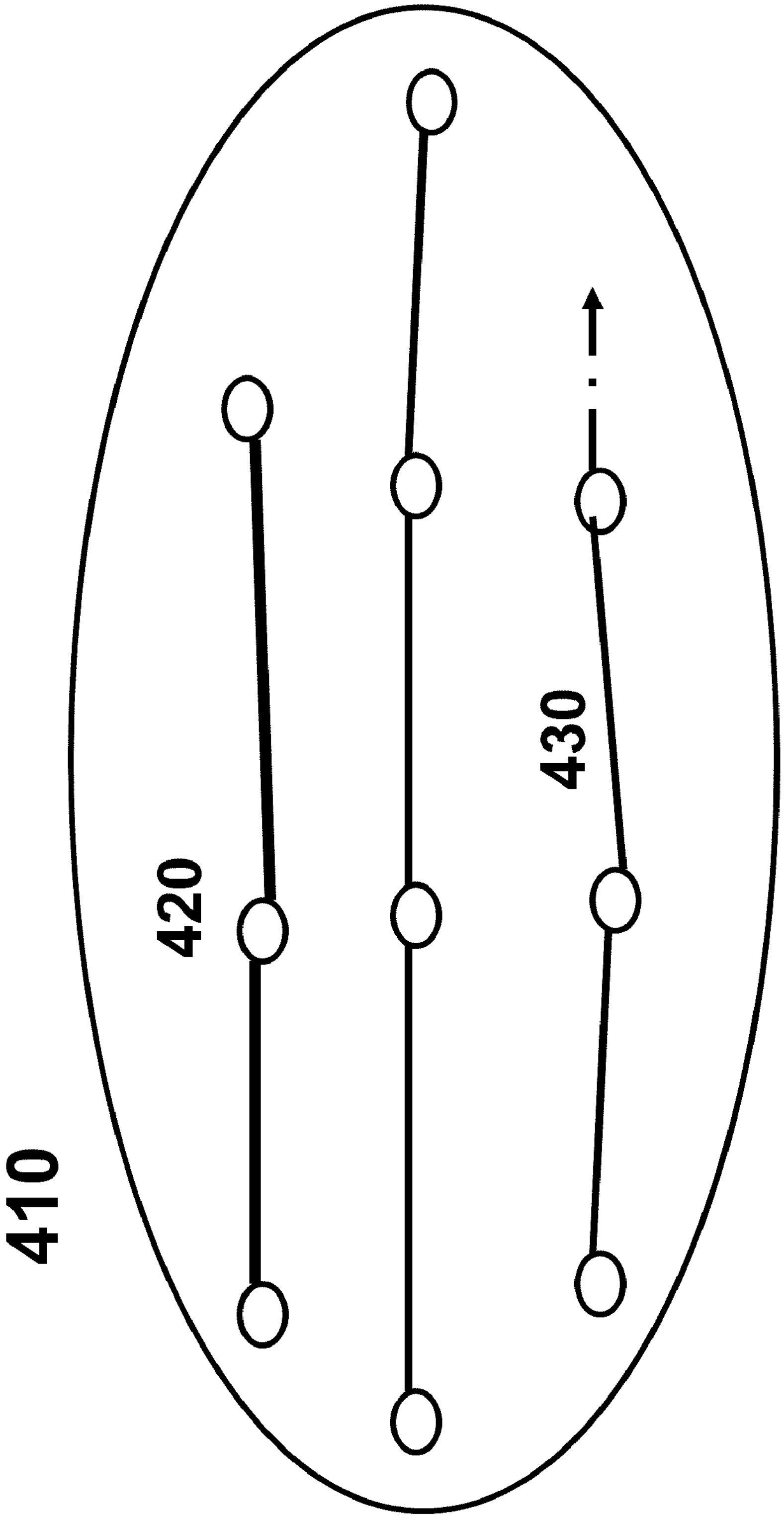
FIG. 10 Plan-view schematic of collection unit network mesh of FIG. 9
Figure 11:
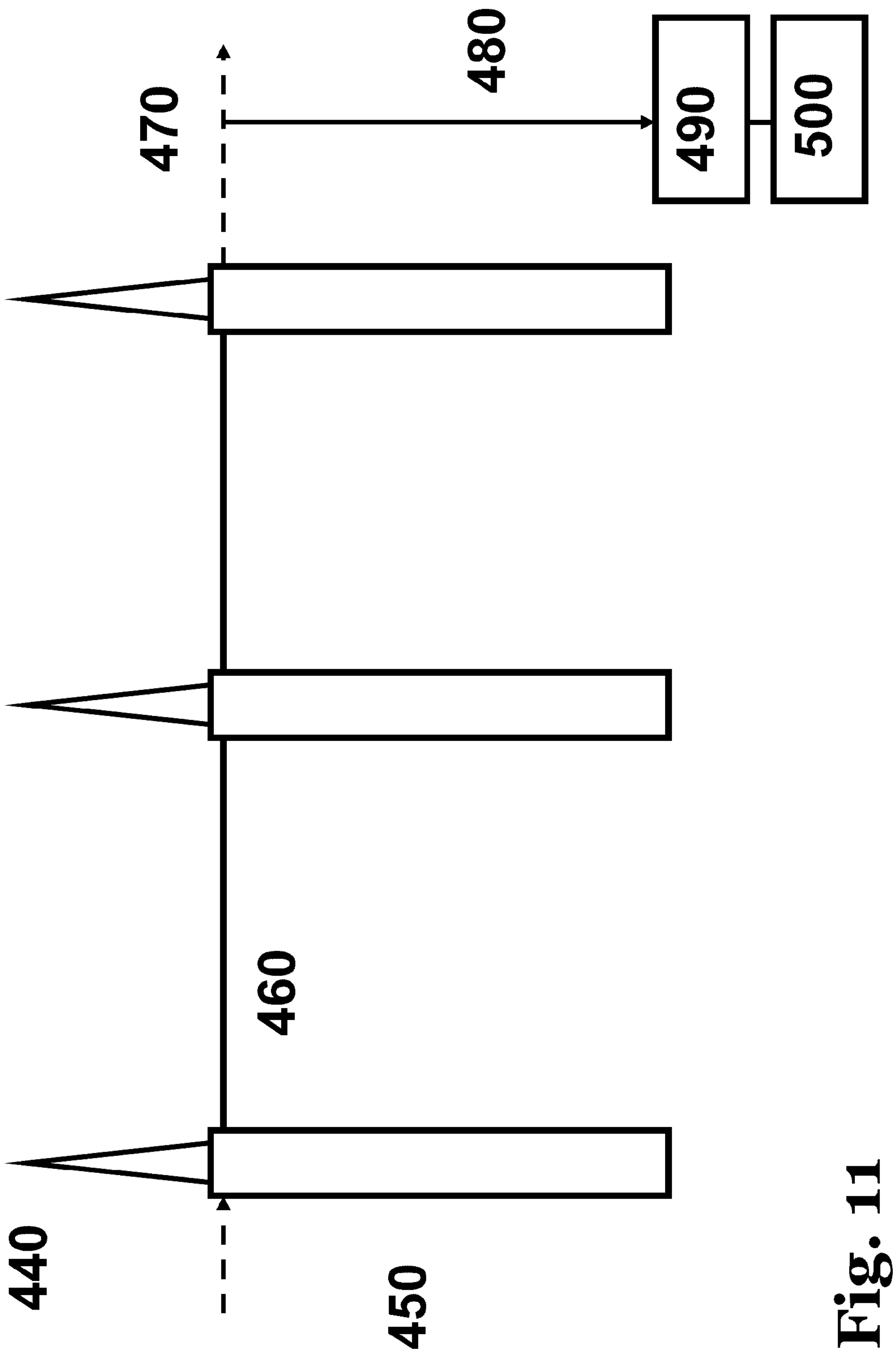
FIG. 11 Schematic showing collection unit deployment on electricity transmission poles linked in a network and fed into the electricity grid.
Figure 12:
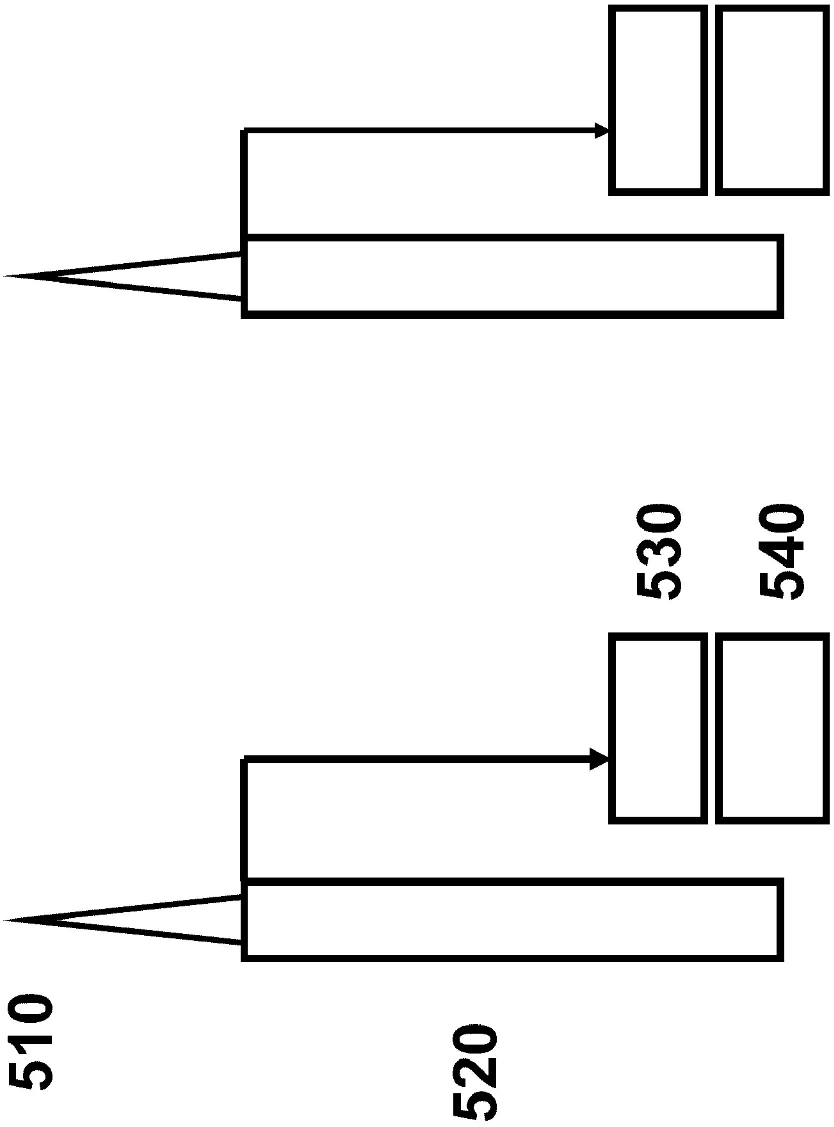
FIG. 12 Schematic showing collection unit deployment on light poles or wireless towers.

Lightning storms are a major cause of wildfire. To address this, in yet another embodiment of this invention as represented in FIG. 9, air terminals 360 are set up on a selection of trees and connected by a conductor 370 in a mesh array as shown in FIG. 10. The impinging charge is transmitted through a conductor 380, through a suppressor unit 390 and on to the storage unit 400.

Utility transmission lines usually have lightning collectors along the length of the network. In this invention as demonstrated in FIG. 11 air terminals 440 deployed transmission poles 450 are linked by a polarized conductor 460. At predetermined locations the impinging charge is conducted through a suppression unit 490 and thereafter into the storage unit 500. The stored energy is periodically released into the grid.

In yet another embodiment of the invention, air terminals 510 are deployed on light poles 520. The collected charged are modified and stored in a storage unit 540.

Figure 13:
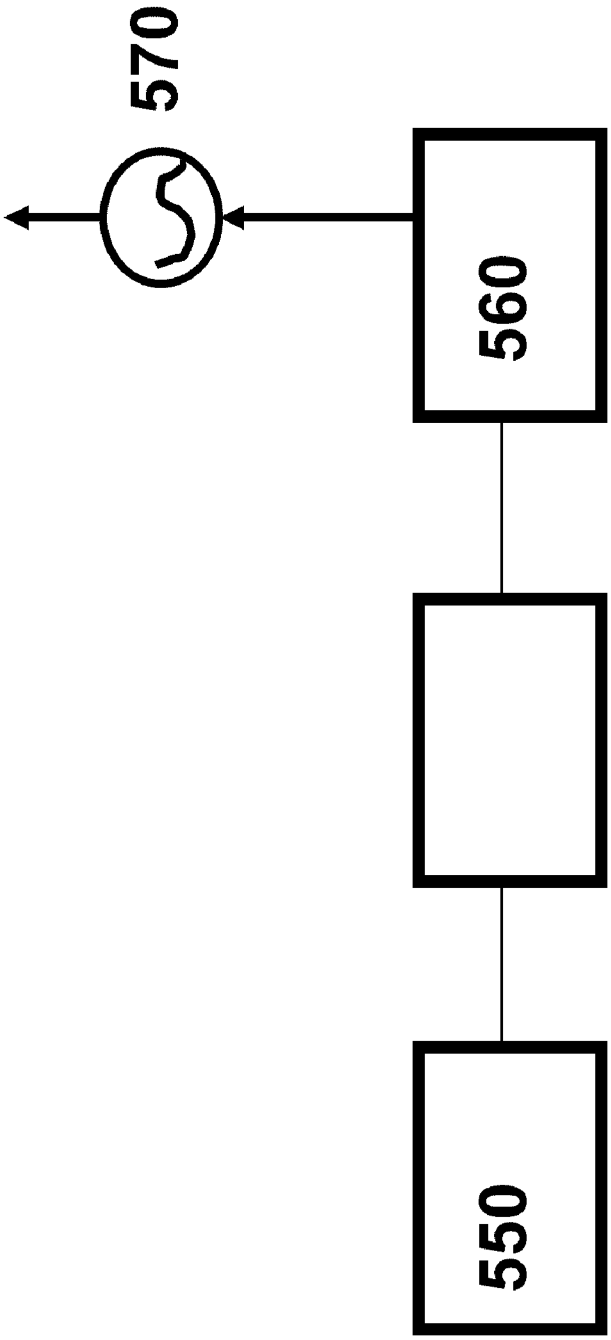
FIG. 13 Schematic showing network of linked collection units and storage units on transmission lines, light poles or wireless towers fed into the grid.
Figure 14:
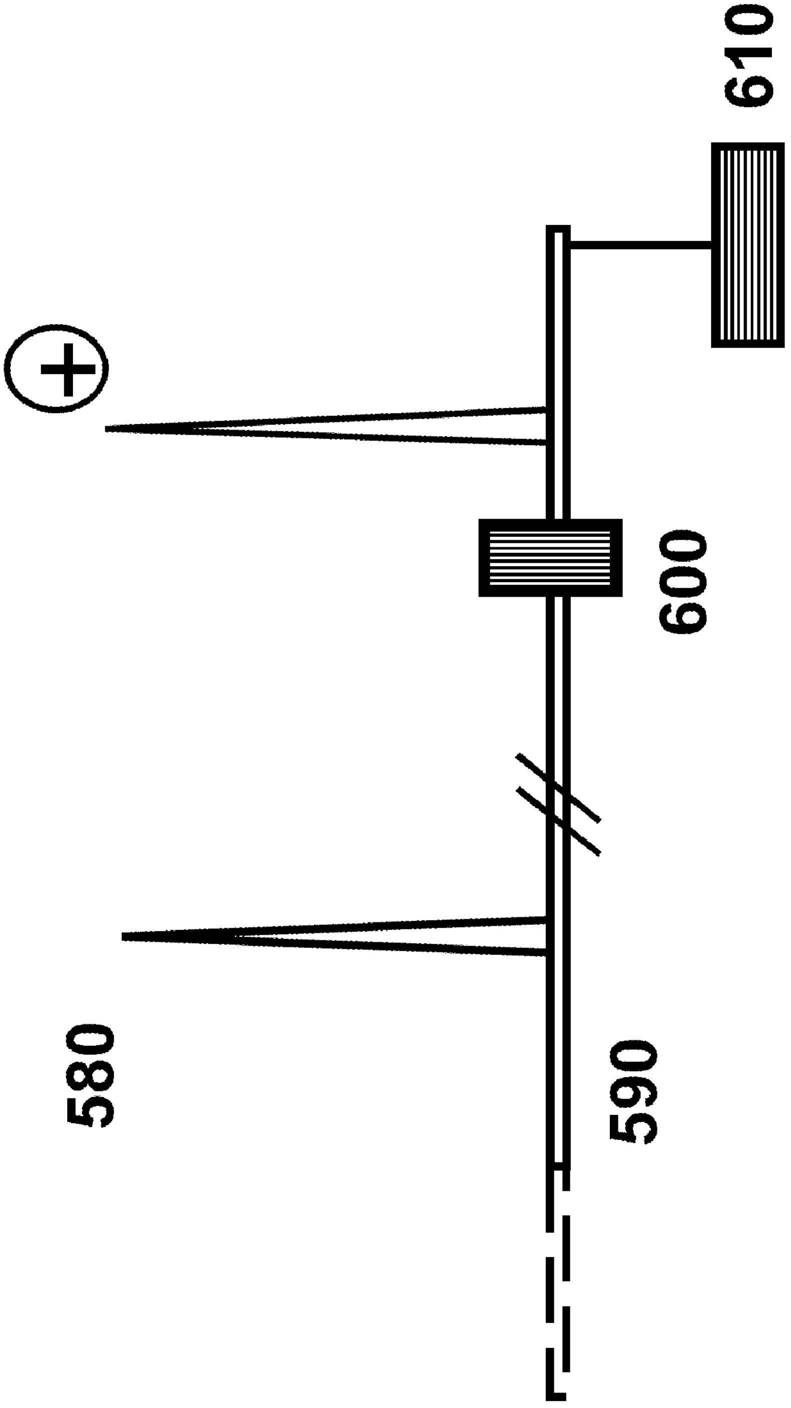
FIG. 14. Schematic of a system for non-spontaneous atmospheric discharge generation and storage.

In another embodiment, the air terminal/collection units are deployed on radio transmission towers. The charge could be stored individually at each tower location or linked in a network as shown in FIG. 13. In either case, the stored energy be used at each individual location or fed into the grid 570.

In the absence of a thundercloud, lightening flash can be generated by the modification of the natural bias between the cloud and ground. This is demonstrated in FIG. 14, where a positively biased conductor 580 of height greater than nearest ground elevation or nearest structure. The increased elevation and bias facilitates cloud to ground discharge even when there is no active lightning storm. The incoming charge is isolated by an insulator 600 and stored in the storage unit 610.

In yet another embodiment of this invention, a balloon of conductive material is tethered to a terminal via a mesh line of conducting material. The balloon captures cloud to cloud discharges which are transmitted down to storage. In yet another embodiment this tether line may be wetted by a conductive solution such as but not limited to salt solution to facilitate the discharge conduction.

Figure 15:
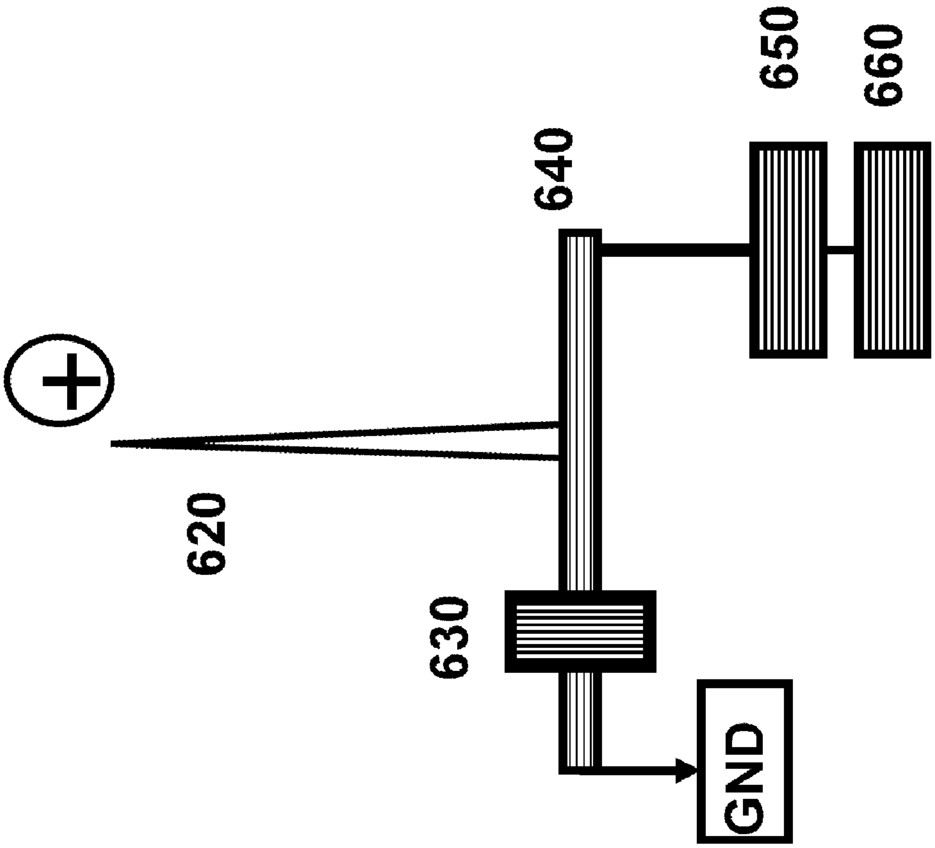
FIG. 15 Schematic of atmospheric discharge collection and storage unit deployable on automotive units.
Figure 16:
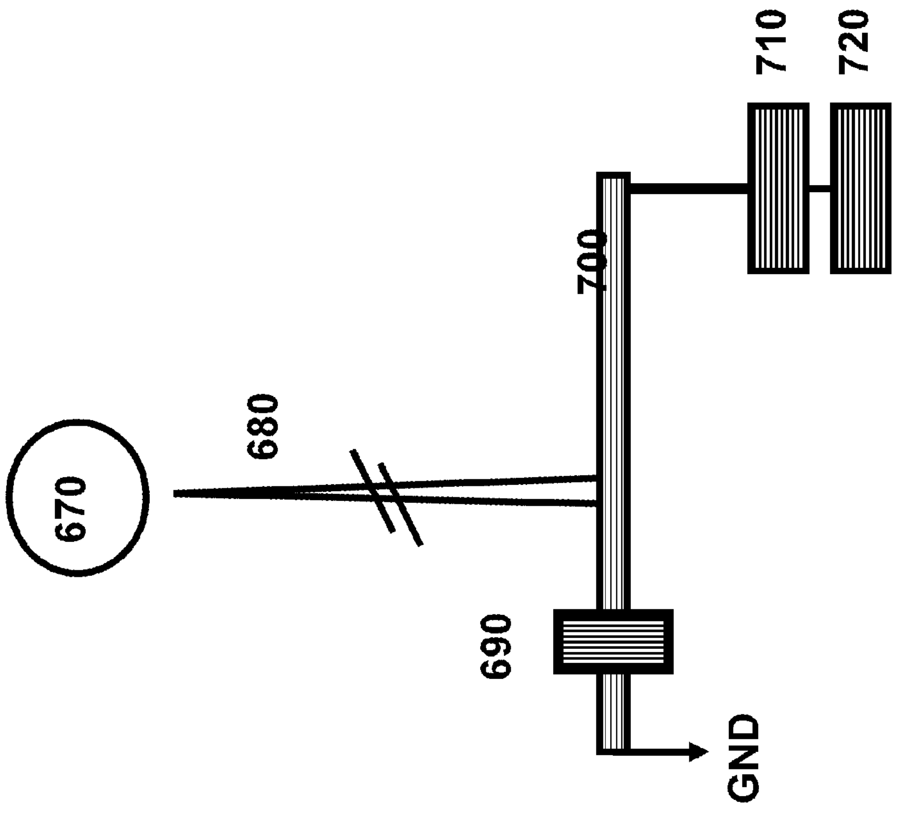
FIG. 16 Schematic of balloon-assisted discharge collection and storage unit.

Another embodiment of this invention is shown in FIG. 15. In an isolated collection system as shown here, the air terminal 620 which may be biased or unbiased is connected to a collection/storage unit 650, 660 respectively by conductor 640 and isolated by a dielectric or insulator 670. Should the discharge exceed the capacity of the isolation, the isolation is bridged and the charge grounded. This isolated collection system is particularly useful where there is no utility grid, particularly in very remote and isolated locations.

This isolated collection capability enables deployment on individual houses and isolated farms. In electric automotive recharge stations, this capability enables the location of these facilities in any location even those not served by regular electricity utilities lines.

In isolated rural areas, the deployment of these isolated collection units enables the provision of electricity where electricity grid infrastructure is not available or practical. The storage units can be deployed in banks as the estimated anticipated usage dictates.

In another embodiment of this invention, the isolated collection unit is modified to be portable for deployment on automobiles. The charge in the storage unit is linked with the automobile's electrical power or storage unit. Alternatively, it can replace the power storage unit of the automobile for pure EV or hybrid cars. Additionally, it can unplug these cars from the grid. With the ambitious industry plans for electric or hybrid cars the infrastructure for charging these cars either in garages or charging stations is somewhat limited. The capability to both 'charge as you go' and unplug from the grid would expand the infrastructure significantly.

In yet another embodiment of this invention, the isolated collection unit is deployed on trains. This could be in commuter trains that directly fed from the grid, or long-haul trains to augment or replace the fossil fuel used.

It is understood that the presentation of these steps in this disclosure is not exhaustive. Only the preferred embodiments of the invention and but a few of the examples of its versatility are shown and described in the present disclosure. It should be readily apparent to those of ordinary skill in the art that the invention is capable of use in various other combinations, environments and applications and is capable of changes or modifications within the scope of the inventive concept as expressed herein. These changes and modifications may be made without departing from the spirit and scope of the invention as set forth in the appended claims.

The invention claimed is:

1. A method of converting an atmospheric electrical discharge into a
 useable form of electrical energy comprising
 deflecting the discharge to an air terminal via one or more separate air terminals of a polarity, the air terminal having an opposite polarity to the polarity of the separate air terminals;
 arresting the discharge via the air terminal to a power mitigating (step down) unit via a conducting unit connected to the air terminal; wherein said power mitigating unit is not a transformer,
 reducing voltage of the discharge via the power mitigating unit modulated according to a capacity of the power mitigating unit, wherein the discharge is grounded if in excess of the capacity, and wherein the power mitigating unit reduces the voltage of the discharge from approximately higher than 100 MV (mega volt) and 100 kA (kilo amperes) to below 20 kV (kilo volt), 10 kA; and
 storing the discharge with the reduced voltage in an energy storage unit connected to the power mitigating unit, the storage unit comprising modules of high energy density capacitors and the storage unit discharging the electrical energy into a power grid or to an appliance.

2. The method of claim 1 wherein the discharge is caused by incident lightning and wherein the arrestor and mitigating unit comprise an array of self-healing varistors in series and parallel chosen to ensure total conversion of the discharge to a voltage/current level suitable for storage in said capacitors.

3. The method of claim 1, where the power mitigation unit a configuration selected from a group consisting of:
 (a) single ZnO varistor,
 (b) Zinc Oxide arrester connected in series with a non-inductive resistor,
 (c) Zinc Oxide arrester in series with a non-inductive resistor and in parallel with a spark gap, and
 (d) a cascade of configurations as described in (c).

4. The method of claim 1 wherein the storage unit comprises modular array of high energy density multilayered doped ceramic capacitors with storage capacity of 10 kW·h (kilowatt hour) to 1 GW·h (gigawatt hour) and volume 0.1 to 1 $m^3$ and up to 1000 units.

5. The method of claim 1 in which the air terminal and the storage unit are configured in a mobile unit and deployed on mobile platform having a battery, wherein the mobile unit provides the electrical energy to power the battery without a need for recharging the battery at fixed charging locations.

6. The method of claim 1 wherein the storage unit is located in a charging station, and wherein the storage unit includes modular capacitors for charging an electric vehicle from the charging station.

7. The method of claim 1 wherein the air terminals are deployed on buildings, wherein a portion of the electrical energy stored is used by the buildings and wherein a portion of electrical energy is stored in a central energy storage facility connected to a plurality of storage units.

8. The method of claim 1 wherein the said storage units are located underground.

9. The method of claim 1 wherein the storage unit is receives energy feeds from more than one electricity generation sources, each source being selected from a group consisting of Thermal energy source, Hydro energy source, Solar energy source, Wind energy source and Lightning energy source.

10. The method of claim 4 wherein the ceramic capacitors are fabricated to provide modulation of effective grain sizes within a specified range.

11. The method of claim 4 wherein the multilayer ceramic capacitors comprises dielectric layers of varying compositions individually or as sandwich layers with each other containing Barium-Titanate silicates as host material doped with Zr, WSi2/WO3 to modulate grain growth to between 0.1 to 10 μm, said modulation providing corresponding control of electrical and reliability properties.

12. The method of claim 2 wherein the varistors comprise multilayers of ZnO and ZnS individually layered or as sandwich layers with each other with ZnO achieving 50-99.9% of each layer, said layers being alloyed metal oxides of transition elements to improve voltage response non-linearity.

13. A method to protect a position from impact of an electrical discharge caused by lightning, the method comprises redirecting the electrical discharge from the position via an array of air terminals to an air terminal of a collection unit, said collection unit comprising a power mitigating unit and a storage unit and wherein the power mitigating unit is not a transformer, the air terminal of the collection unit biased with a first polarity, each of the array of air terminals biased with a second polarity with a magnitude, the second polarity opposite to the first polarity, wherein the redirection is controlled by the magnitude and the second polarity; and storing the electrical discharge in the collection unit located significantly removed from the impact position.

14. The method of claim 13 wherein the discharge redirection is via a biased conductor to the collection unit.

15. The method of claim 13 wherein the position is located in an area of a forest, wherein the array of air terminals are deployed on trees in the forest, wherein tips of the array of air terminals are positioned in close proximity to treetops of the trees, and wherein the discharge is fed into an electricity grid as electrical energy from the collection unit.

16. The method of claim 1 wherein the storage unit is connected to electrical power lines of the power grid and wherein the electrical energy is fed back into the power grid via the electrical power lines.

17. The method of claim 1 wherein the storage unit is located at a telecom tower, a light poles or other free standing structure with a need for operational energy and wherein the electrical energy from the storage unit is used for the operational energy.

18. A method of generation of atmospheric discharge, the method comprising:

modulating bias of a dipole air terminal conductor to capture charges from clouds to ground without occurrence of natural lightning, the conductor including a balloon, a terminal and a tether line connecting the balloon and the terminal, wherein the bias has a magnitude and a polarity controlled by the modulation relative to the ground; and wherein the tether line is a conductive cable soaked by an ionic liquid including salt solution to facilitate conduction of the charge, and storing the charge in a collection unit comprising a power mitigation unit and a storage unit wherein said power mitigation unit is not a transformer, feeding said charge into an electricity grid or appliance.

* * * * *